United States Patent
Venna et al.

(10) Patent No.: US 11,989,012 B2
(45) Date of Patent: May 21, 2024

(54) METHOD AND APPARATUS TO AUTOMATE PUMP-DOWN OPERATION

(71) Applicant: Halliburton Energy Services, Inc., Houston, TX (US)

(72) Inventors: Atchyuta Ramayya Venna, Houston, TX (US); Sudhir Kumar Gupta, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 924 days.

(21) Appl. No.: 17/007,098

(22) Filed: Aug. 31, 2020

(65) Prior Publication Data

US 2021/0262303 A1 Aug. 26, 2021

Related U.S. Application Data

(60) Provisional application No. 62/979,108, filed on Feb. 20, 2020.

(51) Int. Cl.
| | |
|---|---|
| *G05B 19/43* | (2006.01) |
| *E21B 7/06* | (2006.01) |
| *E21B 23/10* | (2006.01) |
| *E21B 23/14* | (2006.01) |
| *E21B 43/116* | (2006.01) |
| *E21B 43/12* | (2006.01) |
| *E21B 44/02* | (2006.01) |
| *E21B 47/01* | (2012.01) |
| *E21B 47/12* | (2012.01) |

(52) U.S. Cl.
CPC .............. *G05B 19/43* (2013.01); *E21B 7/068* (2013.01); *E21B 23/10* (2013.01); *E21B 23/14* (2013.01); *E21B 43/116* (2013.01); *E21B 43/128* (2013.01); *E21B 44/02* (2013.01); *E21B 47/01* (2013.01); *E21B 47/12* (2013.01)

(58) Field of Classification Search
CPC ...................................................... G05B 19/43
See application file for complete search history.

(56) References Cited

U.S. PATENT DOCUMENTS

| | | | |
|---|---|---|---|
| 2013/0138254 A1 | 5/2013 | Seals et al. | |
| 2016/0290077 A1* | 10/2016 | Aske | E21B 47/008 |
| 2017/0241221 A1 | 8/2017 | Seshadri et al. | |
| 2017/0314353 A1* | 11/2017 | Viassolo | E21B 41/00 |
| 2018/0051540 A1* | 2/2018 | Castillo | E21B 47/007 |
| 2018/0135398 A1* | 5/2018 | Entchev | E21B 44/005 |
| 2020/0224508 A1* | 7/2020 | Chapman | E21B 47/008 |

* cited by examiner

*Primary Examiner* — Suresh Suryawanshi
(74) *Attorney, Agent, or Firm* — Kilpatrick Townsend & Stockton LLP

(57) ABSTRACT

A method for controlling a pump-down operation in a wellbore includes selecting a target value for downhole tension of a support cable and a recommended job speed to convey a wireline tool string down a section of the wellbore, generating a line speed signal for controlling a line speed of the support cable and a pumprate signal to control a pumprate of a hydraulic fluid in the wellbore, determining a first error between the target value for downhole tension and a measured value of the downhole tension, determining a second error between the recommended job speed and an actual line speed, and maintaining the target value for the downhole tension by simultaneously controlling the line speed and the pumprate using a value for the line speed signal and a value for the pumprate signal generated based on the first and second errors.

20 Claims, 10 Drawing Sheets

METHOD AND APPARATUS TO AUTOMATE PUMP-DOWN OPERATION

CROSS-REFERENCE TO RELATED APPLICATIONS

This claims priority to U.S. Provisional Patent Application No. 62/979,108, filed on Feb. 20, 2020, and titled "Method and Apparatus to Automate Pump-Down Operation," the disclosure of which is hereby incorporated by reference in its entirety.

TECHNICAL FIELD

The present disclosure relates generally to wellbore operations. More specifically, but not by way of limitation, this disclosure relates to controlling wireline speed and pump flowrate.

BACKGROUND

Pump-down operations are performed to convey wireline tools in inclined sections of a wellbore where gravity alone is insufficient to move the tool. For example, a perforating gun is a wireline tool that needs to be placed at predetermined depth and actuated to perforate the wellbore casing and fracture the formation. A pump-down system may include a wireline unit (e.g., a winch) and a pump unit. The wireline unit and the pump unit may be operated by different operators who communicate with each other, for example, via radio. To push the wireline tool through inclined sections of the wellbore, the wireline cable should be released simultaneously with water or drilling mud being pumped down the wellbore to maintain tension on the cable within a specified range. If the tension is below the specified range, slack can be created in the wireline cable, leading to damage of the wireline cable.

DETAILED DESCRIPTION

Figure 1:
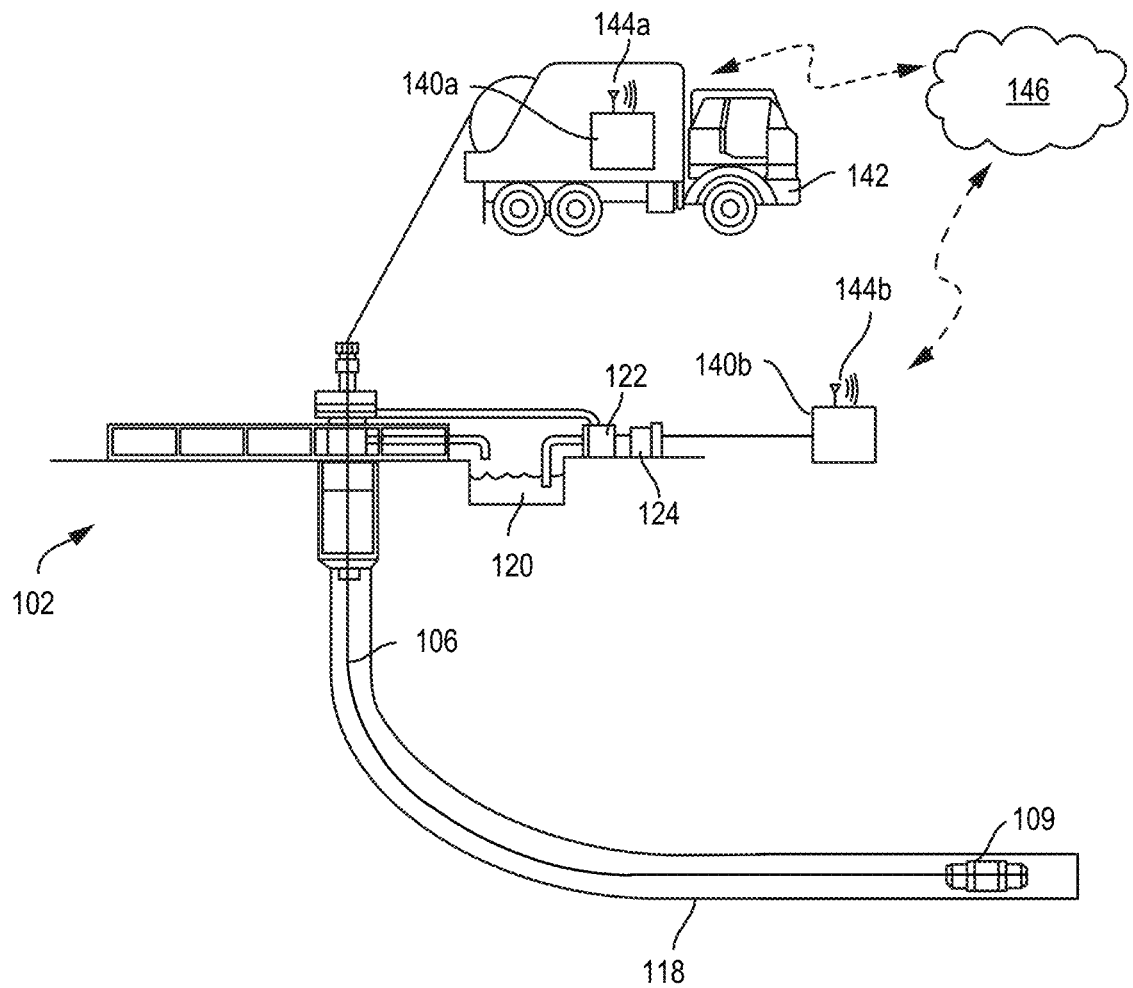
FIG. 1 is a cross-sectional side view illustrating an example of some equipment used in oil and gas drilling processes according to some aspects of the present disclosure.

Certain aspects and examples of the present disclosure relate to a method to automate the pump-down operation by simultaneously controlling wireline speed and pumprate under closed loop control to achieve target downhole wireline cable tension and recommended job speed. Wireline tools may be conveyed down a wellbore using hydraulic pressure to move the tool, particularly in inclined and horizontal sections of the wellbore. The hydraulic pressure and the wireline speed should be balanced to permit the tool to be conveyed down the wellbore at a highest safe speed. Imbalances between the hydraulic pressure in the wireline speed can lead to a condition known as pump-off, where the tool separates from the wireline cable. Recovery of the tool after pump-off can be an expensive and time-consuming process. In order to convey a wireline tool down a wellbore at a highest safe speed while avoiding pump-off, aspects of the present disclosure can provide simultaneous control of wireline speed and hydraulic pump flowrate with a closed-loop control system.

Wireline tools such as perforating guns, wellbore logging tools, acoustic tools, nuclear magnetic resonance (NRM) tools, etc., may be conveyed in inclined sections of a wellbore using a pump-down system. Inclined sections of a wellbore may include sections that deviate from vertical (e.g., inclined sections) by an angle up to and including 90 degrees (e.g., horizontal sections). Further, deviations from a horizontal section may also be included as inclined sections. A pump-down operation uses hydraulic pressure from, for example, water or drilling fluid, to convey the wireline tool along an inclined or curved section of a wellbore where gravity is ineffective to move the tool as it would in a vertical wellbore. A pump-down system may include a wireline unit (e.g., a winch) and a pump unit. Ideally, the wireline unit should release the wireline cable simultaneously with water or drilling mud being pumped down the wellbore by the pump unit to maintain tension on the cable within a specified range.

During a pump-down operation, tension may increase in the wireline cable to an extent that the cable is damaged or completely severed (e.g., at a weak point where the cable attaches to the tool), a condition known as pump-off. Pump-off requires expensive and time-consuming remediation. Effective and efficient pump-down operations avoid pump-off and can complete the job (e.g., pump-down operation) in less time. Avoiding pump-off can save money and reduce nonproductive time. Further, running the job with recommended speed can reduce water or drilling fluid needed for pump-down, and save drilling mud and pump-down operation time. Automating the pump-down operation can reduce manual intervention by field operators, as well as reducing human errors.

Apparatuses and methods according to the present disclosure can provide an automatic pump-down method to maintain recommended tension on the wireline cable and run the pump-down operation at recommended speed by controlling both wireline speed and pumprate in a closed loop configuration. Recommended job speed can be selected by the operator or can be precomputed based on tool and wellbore geometry, inclination of the wellbore, fluid properties, maximum pump rate available, etc.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional side view illustrating an example of some equipment used in oil and gas recovery processes. Referring to FIG. 1, a wellbore 118 of the type used to extract hydrocarbons from a formation may be created by drilling into the earth 102. After creation of the wellbore 118, various operations may be performed downhole using wireline tools. A wireline tool 109, for example, a logging tool, a perforating gun, packer, or other downhole completion or production components, may be positioned or otherwise arranged on a wireline cable 109 that extends into the wellbore 118 from the surface and may be conveyed downhole. Drilling fluid or "mud" from a tank 120 may be pumped downhole using a hydraulic pump 122 powered by an adjacent power source, such as a prime mover or motor 124 to convey the tool 109 along inclined and horizontal sections of the wellbore 118.

Sensors and/or instrumentation related to operation of the system 100 may be connected to a computing device 140a. In various implementations, the computing device 140a may be deployed in a work vehicle, may be permanently installed with the system 100, may be hand-held, or may be remotely located. In some examples, the computing device 140a may process at least a portion of the data received and may transmit the processed or unprocessed data to a remote computing device 140b via a wired or wireless network 146. The computing device 140b may be onsite, or may be offsite, such as at a data-processing center. The computing device 140b may receive the data, execute computer program instructions to analyze the data, and communicate the analysis results to the computing device 140a. For example, the computing device 140a may communicate with a controller configured to control a winch (e.g., deployed in a work vehicle 142) for feeding the wireline cable 106, and the computing device may communicate with a controller configured to control the hydraulic pump 122.

Each of the computing devices 140a, 140b may include a processor interfaced with other hardware via a bus. A memory, which may include any suitable tangible (and non-transitory) computer-readable medium, such as RAM, ROM, EEPROM, or the like, can embody program components that configure operation of the computing devices 140a, 140b. In some aspects, the computing devices 140a, 140b may include input/output interface components (e.g., a display, printer, keyboard, touch-sensitive surface, and mouse) and additional storage.

The computing devices 140a, 140b may include communication devices 144a, 144b. The communication devices 144a, 144b may represent one or more components that facilitate a network connection. In the example shown in FIG. 1, the communication devices 144a, 144b are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 144a, 144b may use acoustic waves, surface waves, vibrations, optical waves, or induction (e.g., magnetic induction) for engaging in wireless communications. In other examples, the communication devices 144a, 144b may be wired and can include interfaces such as Ethernet, USB, IEEE 1394, or a fiber optic interface. The computing devices 140a, 140b may receive wired or wireless communications from one another and perform one or more tasks based on the communications. Methods and systems of the present disclosure may be applied in all phases of hydrocarbon production (e.g., well drilling, well completion, recovery and production).

Figure 2:
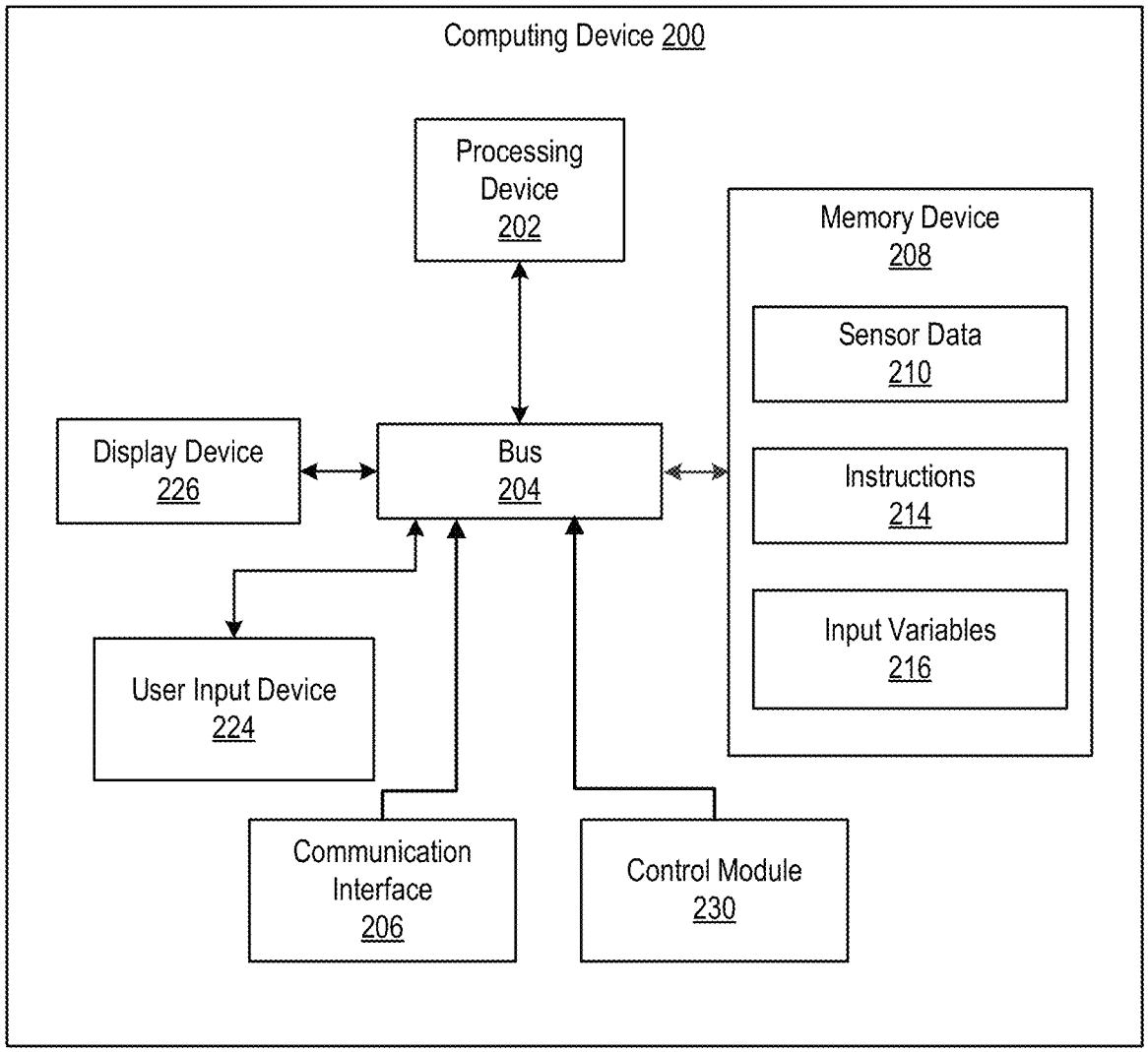
FIG. 2 is a block diagram of an example of a computing device according to one example of the present disclosure.

FIG. 2 is a block diagram of an example of a computing device 200 according to one example of the present disclosure. The computing device 200 may be, for example, one or both of the computing devices 140a, 140b of FIG. 1. The computing device 200 can include a processing device 202, a bus 204, a communication interface 206, a memory device 208, a user input device 224, a display device 226, and a control module 230. In some examples, some or all of the components shown in FIG. 2 can be integrated into a single structure, such as a single housing. In other examples, some or all of the components shown in FIG. 2 can be distributed (e.g., in separate housings) and in communication with each other.

The processing device 202 can execute instructions 214 stored in the memory device 208 to perform the pump-down operations. The processing device 202 can include one processing device or multiple processing devices. Non-limiting examples of the processing device 202 include a Field-Programmable Gate Array ("FPGA"), an application-specific integrated circuit ("ASIC"), a microprocessing device, etc.

The processing device 202 can be communicatively coupled to the memory device 208 via the bus 204. The non-volatile memory device 208 may include any type of memory device that retains stored information when powered off. Non-limiting examples of the memory device 208 include electrically erasable and programmable read-only memory ("EEPROM"), flash memory, or any other type of non-volatile memory. In some examples, at least some of the memory device 208 can include a non-transitory medium from which the processing device 202 can read instructions. A computer-readable medium can include electronic, optical, magnetic, or other storage devices capable of providing the processing device 202 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the memory device 208 can include sensor data 210, for example, strain gauge data, etc. The memory device 208 can also include a database of input variables, such as, mud weight, inclination of the wellbore, bending moment, as well as constraints such as kinematics constraints, and safety constraints. In some examples, the memory device 208 can include a computer program code instructions 214 for control of various aspects of the pump-down operations. Other collected data related to the pump-down operations may be stored in a log 220.

In some examples, the computing device 200 can include a communication interface 206. The communication interface 206 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network). In some examples, the computing device 200 can include a user input device 224. The user input device 224 can represent one or more components used to input data. Examples of the user input device 224 can include a keyboard, mouse, touchpad, button, or touch-screen display, etc. In some examples, the computing device 200 includes a display device 226. The display device 226 can represent one or more components used to output data. Examples of the display device 226 can include a liquid-crystal display (LCD), a computer monitor, a touch-screen display, etc. In some examples, the user input device 916 and the display device 226 can be a single device, such as a touch-screen display.

The control module 230 may implement the control algorithm for automated pump-down operation according to some aspects of the present disclosure as described in more detail below.

Figure 3:
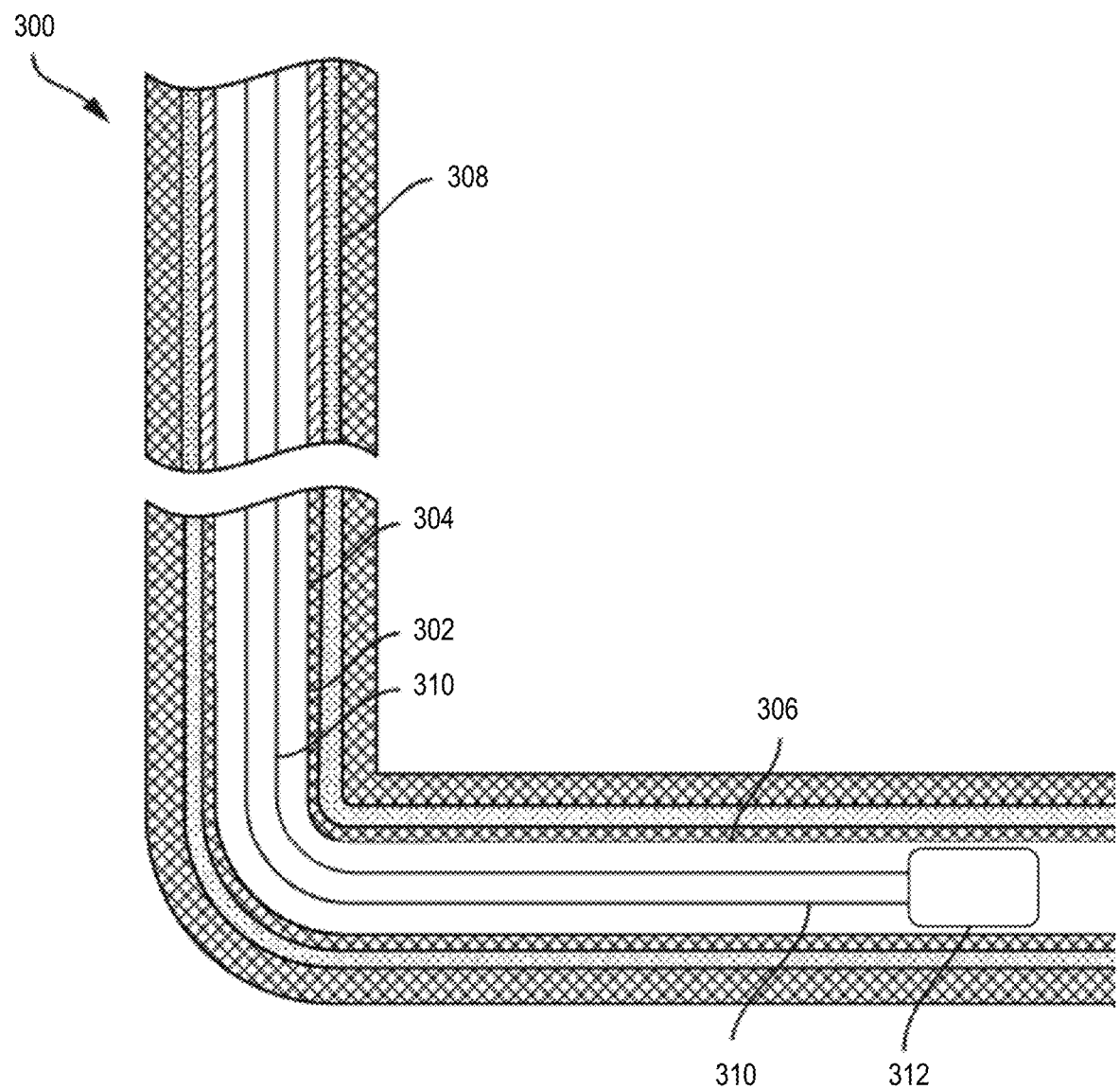
FIG. 3 depicts a cross-sectional view of a wellbore assembly including a wireline tool according to one example.

FIG. 3 depicts a cross-sectional view of a wellbore assembly 300 including a wireline tool 312 according to one example. The wellbore 302 can extend through various earth strata. The wellbore 302 can extend through a hydrocarbon-bearing subterranean formation 324. The wellbore 302 can have a substantially vertical section 304 and an inclined section 306. The substantially vertical section 304 and the inclined section 306 can include a casing string 308 cemented at an upper segment of the substantially vertical section 304 and through a portion of the inclined section 306. A wireline cable 310 can extend from the surface within wellbore 302. The wireline tool 312, for example, a logging tool, a perforating gun, packer, or other downhole completion or production components, can be conveyed downhole on the wireline cable 310.

Some aspects of the present disclosure can provide apparatuses and methods to automate the pump-down operation by simultaneously controlling wireline cable speed and pumprate in a closed loop configuration. The recommended downhole tension target range can be maintained on the wireline cable by running the job with recommended wireline speed. Gains of proportional-integral-derivative (PID) controllers may be adjusted dynamically based on the operating point (e.g., wireline speed and pumprate), tool geometry, and wellbore geometry. The dynamic gain adjustments can improve the response time of both pumprate and wireline speed adjustments.

In the proposed method, downhole tension on the wireline cable, wireline speed from the winch, pumprate from a hydraulic pump, and inclination of the wellbore may be measured by various sensors on a wireline tool, the winch, and the hydraulic pump, or derived from other measured parameters. These measured inputs with specified parameters of a tension threshold and recommended wireline speed may be fed to one or more control algorithms. The one or more control algorithms may process the inputs and generate commands to a winch controller and a pump controller to simultaneously adjust both wireline cable speed and pumprate.

During the process, separate gain values may be applied to the downhole tension error to generate a wireline speed command and a pumprate command. These gains may be adjusted dynamically via the control algorithm control based on target downhole tension, recommended wireline speed, and wellbore and tool geometries. In some implementations, fixed gain values may be applied by a computer or manually by an operator. The response of the downhole tension to the pumprate may be slower than response to the wireline speed. For the changes in downhole tension error, even though the control algorithm generates commands to both the winch and the pump, wireline speed may be adjusted initially to maintain downhole tension, and recommended job speed is reached once the commanded pumprate is achieved.

Figure 4:
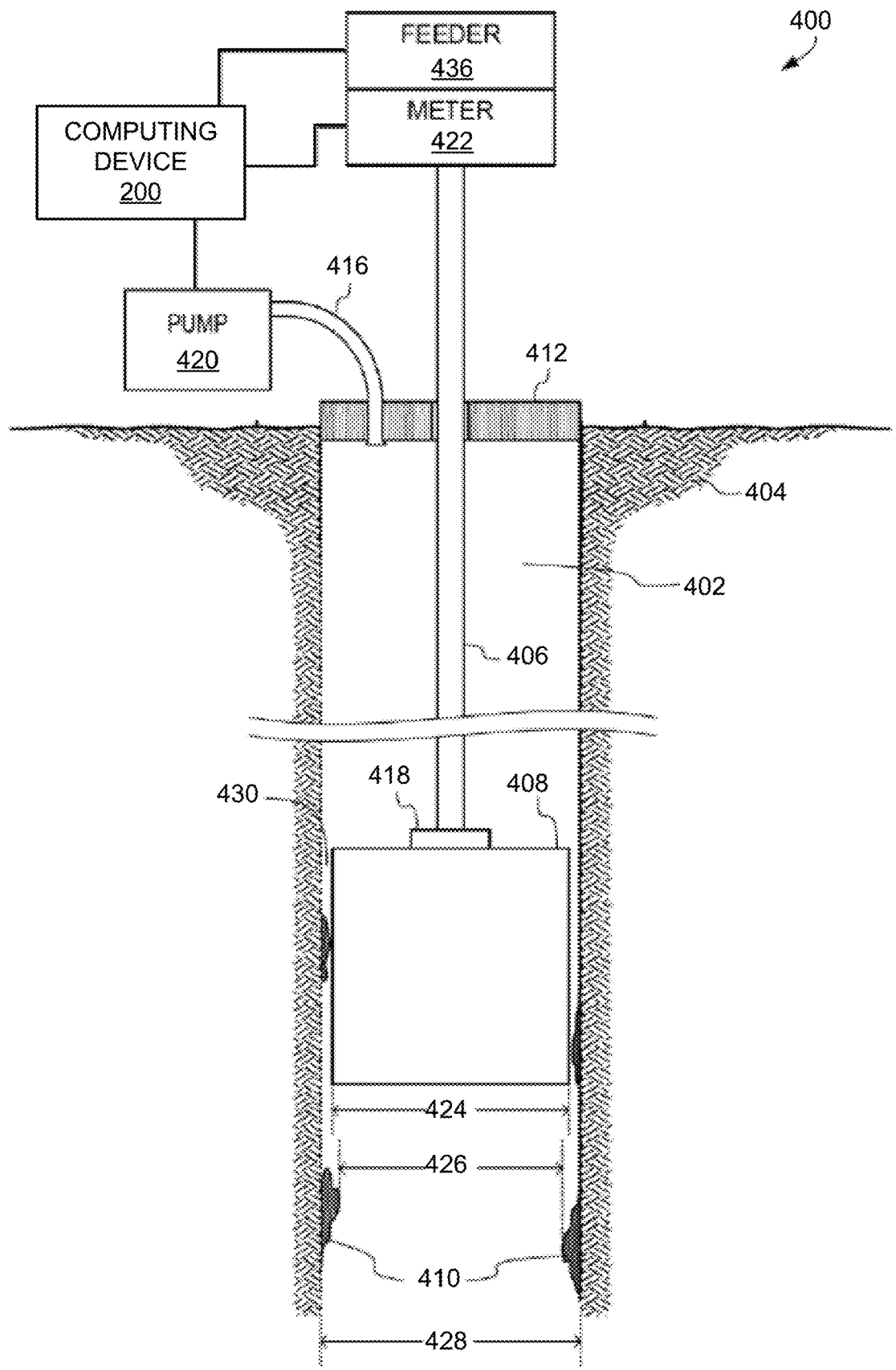
FIG. 4 is a schematic diagram of a wellbore servicing system that includes a tool positioned by a pump-down operation according to one example.

FIG. 4 is a schematic diagram of a wellbore servicing system 400 that includes a tool 408 positioned by a pump-down operation according to one example. The wellbore servicing system 400 may also include a wellbore 402 penetrating a subterranean formation 404 for the purpose of recovering hydrocarbons, storing hydrocarbons, disposing of carbon dioxide, or the like. The wellbore 402 can be drilled into the subterranean formation 404 using any suitable drilling technique. While shown as extending vertically from the surface in FIG. 4, in other examples the wellbore 402 can be deviated, inclined, or curved over at least some portions of the wellbore 402. The wellbore 402 can be cased, open hole, contain tubing, and can include a hole in the ground having a variety of shapes or geometries.

A service rig, such as a drilling rig (e.g., the drilling rig of FIG. 1), a completion rig, a workover rig, or other mast structure or combination thereof can support a support line (e.g., a wireline cable) 310, 406 in the wellbore 402, but in other examples a different structure can support the support line 310, 406. In some aspects, a service rig can include a derrick with a rig floor through which the support line 310, 406 extends downward from the service rig into the wellbore 402. The servicing rig can be supported by piers extending downwards to a seabed in some implementations. Alternatively, the service rig can be supported by columns sitting on hulls or pontoons (or both) that are ballasted below the water surface, which may be referred to as a semi-submersible platform or rig. In an off-shore location, a casing may extend from the service rig to exclude sea water and contain drilling fluid returns.

Other mechanical mechanisms that are not shown may control the run-in and withdrawal of the support line 310, 406 in the wellbore 402. Examples of these other mechanical mechanisms include a draw works coupled to a hoisting apparatus, a slickline unit or a wireline unit including a winching apparatus, another servicing vehicle, or other such mechanisms. As used herein, the term support line feeder 436 refers to any mechanism, for example, but not limited to, the mechanisms described above, used to feed the support line 310, 406 into the wellbore 402 and/or determine the support line feed rate.

The support line 310, 406 may be a wireline cable or other suitable line, for example, slickline, coiled tubing, etc., for supporting a tool 408 positionable downhole by a pump-down procedure. In some examples, the tool 408 may be, for example, a perforating gun, a logging tool, an acoustic tool, a nuclear magnetic resonance (NMR) tool, etc. The support line 310, 406 can additionally supply the tool 408 with power, fluid, data communication, or other connection with the surface. The wellbore 402 can include a seal 412 into which a pressurized fluid can be injected behind the tool 408 (e.g., between the seal 412 and the tool 408) to force the tool 408 downhole. The seal 412 can be located at or adjacent the surface, or elsewhere. The pressurized fluid can be provided through a duct 416 by a hydraulic pump 420. The pumprate of the pump 420 can be adjusted to increase or decrease the pressure build-up behind (e.g., above) the tool 408, thus forcing the tool 408 further downhole.

The support line 310, 406 can support the tool 408 to pull the tool 408 out of the wellbore (e.g., upwards as seen in FIG. 4). The support line 310, 406 can be coupled to a surface meter 422 capable of measuring the tension of the support line 310, 406 at the surface. Additionally, a tool-mounted meter 418 can measure the tension of the support line 310, 406 downhole.

The tool 408 can have a tool outer diameter 424. The tool outer diameter 424 can be slightly smaller than the wellbore inner diameter 428, allowing the tool to pass through the wellbore. An annulus 430 can exist between the tool outer diameter 424 and the wellbore inner diameter 428.

During a pump-down procedure, the pumprate of the pump 420 and the support line feed rate can be adjusted to position the tool 408 downhole at a desired location. Due to irregularities in the boring process and/or tubulars that make up the casing of the wellbore 402, the wellbore inner diameter 428 can be uneven. Additionally, blockages 410 can be present along the inner walls of the wellbore 402. Blockages 410 and other irregularities can result in restrictions 426 having diameters smaller than the tool outer diameter 424, thus stopping or slowing travel of the tool 408. Use of a higher pumprate can help dislodge blockages 410 and/or force the tool 408 past the blockage. In some cases, if the wellbore diameter decreases, for the same pumprate the effective annulus may become smaller. In such cases, the tool 408 can be accelerated and pump-off can occur.

A computing device, for example, the computing device 200, can be coupled (e.g., wired or wirelessly) to the pump 420 and one or both of meter 422 and meter 418 for carrying out the methods described herein. The computing device 200 can also be coupled to wireline feeder 436. The computing device 200 can be coupled to a memory, for example, the memory device 208, containing programming instructions for carrying out the methods described herein. The memory device 208 can further contain the pump-down models described herein. The memory device 208 can by any non-transitory computer-readable storage medium.

Figure 5:
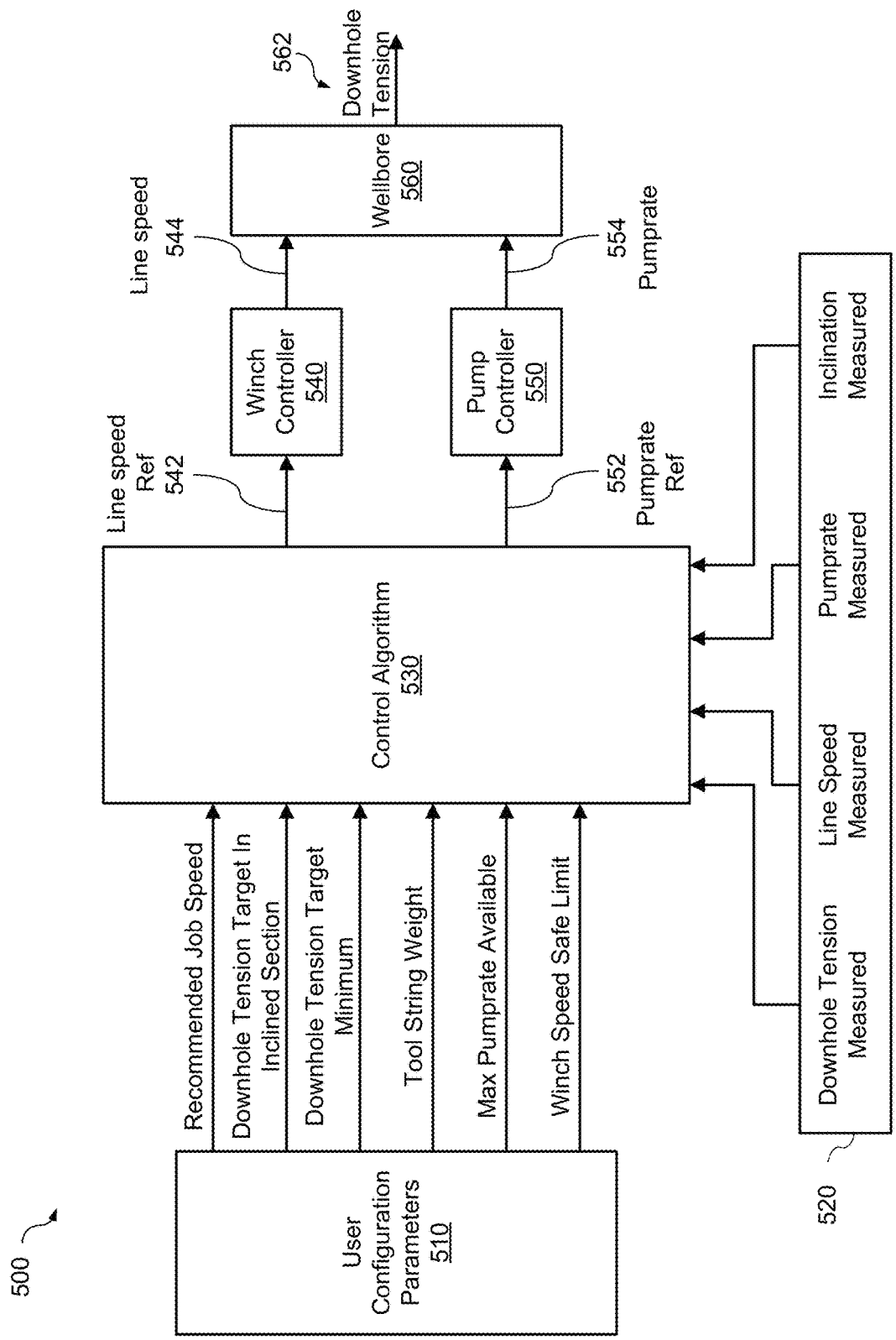
FIG. 5 is a block diagram illustrating an example of control module for implementing a control algorithm for automated pump-down operation according to some aspects of the present disclosure.

FIG. 5 is a block diagram illustrating an example of control module 500 for implementing a control algorithm for automated pump-down operation according to some aspects of the present disclosure. The control module 500 may be implemented by a computing device, for example the control module 230 of the computing device 200, or by another computing device. Referring to FIG. 5, the control module 500 may take user configuration parameters 510 and measurement parameters 520 as inputs to the control algorithm 530, and may output a line speed reference signal 542 and a pumprate reference signal 532.

The user configuration parameters 510 may include a recommended job speed, a value for downhole tension target in inclined section of the wellbore, a value for minimum downhole tension target, tool string weight, maximum available pumprate, and a winch speed safe limit, among other parameters. The measurement parameters 520 may include downhole tension, line speed, pumprate, and wellbore inclination, among others.

The configuration parameters 510 and measurement parameters 520 may be input to the control algorithm 530. The control algorithm 530 may output the line speed reference signal 542 to a winch controller 540, and the pumprate reference signal 532 to a pump controller 550. The winch controller 540 and the pump controller 550 may generate line speed signals 544 and pumprate signals 554, respectively, to control the downhole tension 562 of the wireline cable (e.g., a wireline cable 310 or 406) in the wellbore 560.

Figure 6:
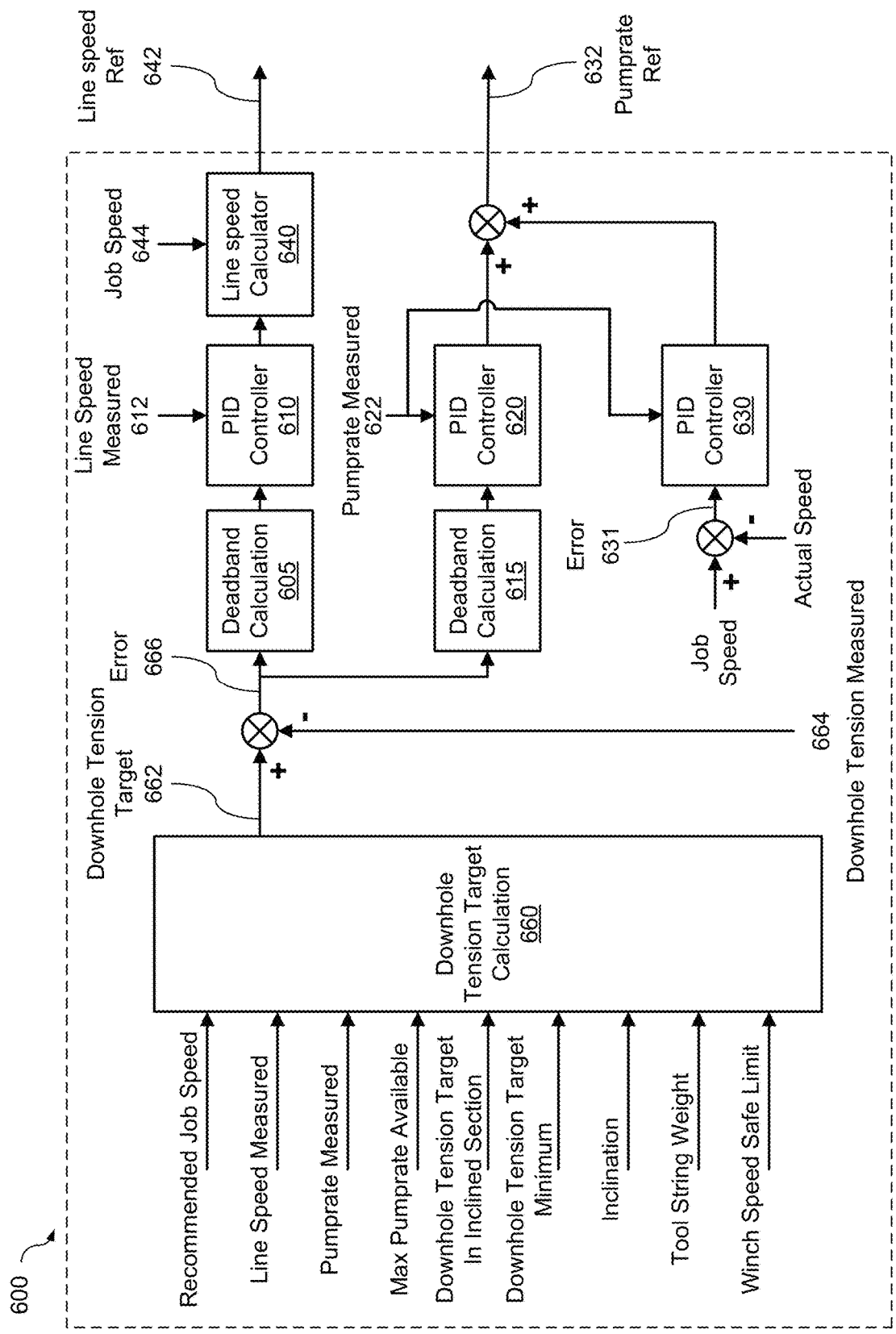
FIG. 6 is a diagram illustrating an example of a control algorithm for automated pump-down operation according to some aspects of the present disclosure.

FIG. 6 is a diagram illustrating an example of a control algorithm 600 for automated pump-down operation according to some aspects of the present disclosure. The control algorithm 600 may be the control algorithm 530 implemented by the control module 500 in FIG. 5. The control algorithm 630 may include a first deadband calculation block 605, a first PID controller 610, a second deadband calculation block 615, a second PID controller 620, a third PID controller 630, and a line speed calculation block 640. The control algorithm 630 may include electronic hardware, software, or a combination of hardware and software to implement the various blocks, and may be implemented by the computing device 200.

Referring to FIG. 6, the control algorithm 630 may control pumprate and line speed such that downhole tension on the wireline cable tracks the target tension subject to the following constraints:

Line Speed=Recommended Job Speed when measured downhole tension is within the band of minimum downhole tension target and maximum downhole tension target 0<Line Speed<LineSpeed_max 0<Pumprate<Pumprate_max Abs(Error)>Error_min where Job Speed is the desired Line Speed, LineSpeed_max and Pumprate_max are the maximum wireline speed and pumprate, respectively, Error_min is the minimum limit of downhole tension error below which controller is not required to respond. Line speed may be maintained at the job speed unless dynamic conditions in the wellbore necessitate decreasing or increasing the line speed.

In some implementations, the control algorithm 630 may implement the control algorithm for automated control of pump-down operations. In some implementations, the control algorithm 630 may generate pumprate and line speed values for manual control of pump-down operations by operators. For example, the pumprate and line speed values generated by the control algorithm may be displayed on a user interface. Operators may use the displayed values to manually control the pumprate and line speed during the pump-down operations.

The deadband calculation blocks 605, 615 may cause the pumprate reference signal 632 and line speed reference signal 642 to remain unchanged when the error signal 666 is less than Error_min. The first PID controller 610 may act on the output signal of the first deadband calculation block 605 and the measured line speed signal 612 to generate the line speed reference signal 642. The second PID controller 620 may act on the output signal of the second deadband calculation block 615 and the measured pumprate signal 622 to generate the pumprate reference signal 632.

The line speed calculation block 640 may generate the line speed reference signal 642 (e.g., a wireline speed reference signal) that can be a maximum of the output of the first PID controller 610 and the job speed input 644 unless the pumprate reaches maximum (Pumprate_max). If the pumprate reaches Pumprate_max, the line speed reference signal 642 may be equal to the output signal of the first PID controller 610.

The first PID controller 610 may be tuned to the response time of the winch controller (e.g., the winch controller 540) that provides the line speed. The second PID controller 620 may be tuned to the response time of the pump controller (e.g., the pump controller 550) that provides the pumprate. The line speed reference signal 642 and the pumprate reference signal 552 may be communicated to the winch controller 540 and the pump controller 550, respectively, to control the line speed of the wireline cable and the pressure of the hydraulic fluid in the wellbore 560.

As shown in FIG. 6, the downhole wireline cable tension target 662 may be compared with the measured downhole tension 664 of the wireline cable. The target value of downhole tension may be computed by the downhole tension target calculation block 660 using the user configuration parameters 510 (e.g., recommended job speed, downhole tension target in inclined section of the wellbore, downhole tension target minimum, tool string weight, maximum available pumprate, winch speed safe limit, etc.) and the measurement parameters 520 (e.g., downhole tension, line speed, pumprate, wellbore inclination, etc.). The target value for downhole tension may be adjusted to maintain line speed equals to recommended job speed under the condition that the downhole tension does not go below a minimum value of downhole tension. Adjustment of the target value of downhole tension will be further described below in conjunction with FIG. 7.

The actual downhole tension on the wireline cable may be measured using a gauge, and the error signal 666 between the downhole tension target signal 662 and the measured downhole tension signal 664 may be determined. The error signal 666 may be input to the deadband calculation blocks 605, 615.

The deadband calculation blocks 605, 615 may determine the amount that the error signal 666 can vary before the respective PID controller responds to the error. The calculations performed by the first deadband calculation block 605 may correspond to the characteristics of the winch and the winch controller (e.g., the winch controller 540), and the calculations performed by the second deadband calculation block 615 may correspond to the characteristics of the pump unit and the pump controller (e.g., the pump controller 550). The outputs of first and second deadband calculation blocks 605, 615 may be input to first and second PID controllers 610, 620, respectively. The first PID controller 620 may generate the wireline line speed reference signal 642 and the second PID controller 620 may generate the pumprate reference signal 632.

The response of the downhole tension to the pumprate may be slower than the response to the wireline speed. The first PID controller 610 (e.g., the wireline speed PID controller) may be tuned to be more aggressive than the second PID controller 620 (e.g., the pumprate PID controller) such that for small changes in downhole tension error, wireline speed may be adjusted quickly, and then the pumprate may be adjusted. However, during large changes of downhole tension error, both the pump and the winch may be controlled to respond as early as possible to avoid pump-off.

An additional control loop including the third PID controller 630 to control recommended job speed may be tuned to respond more slowly than other two PID controllers. The slower response of the third PID controller 630 may provide control loop stability for the system. The third PID controller 630 of the third control loop may act on an error signal 631 between the job speed signal and the measured line speed signal as well the measured pumprate signal 622. The third PID controller 630 may adjust job speed to the recommended job speed when the downhole tension error is within the limits by providing an adjustment to the pumprate reference signal 632.

The gain values for the PID controllers can be adjusted dynamically during the pump-down operation using wireline speed, pumprate, and wellbore and tool geometries (adaptive control). In some implementations, the gains of the PID controllers can be predetermined based on a simulation that uses the wellbore and tool geometries. In some implementations, the gains of the PID controllers may be selected based on a trial and error method. In some implementations, the deadband calculation may be eliminated and the downhole tension error may be input directly to the PID controllers. In some implementations, the downhole tension target may be a fixed value or may be obtained from a look-up table based on inclination of the wellbore.

Figure 7:
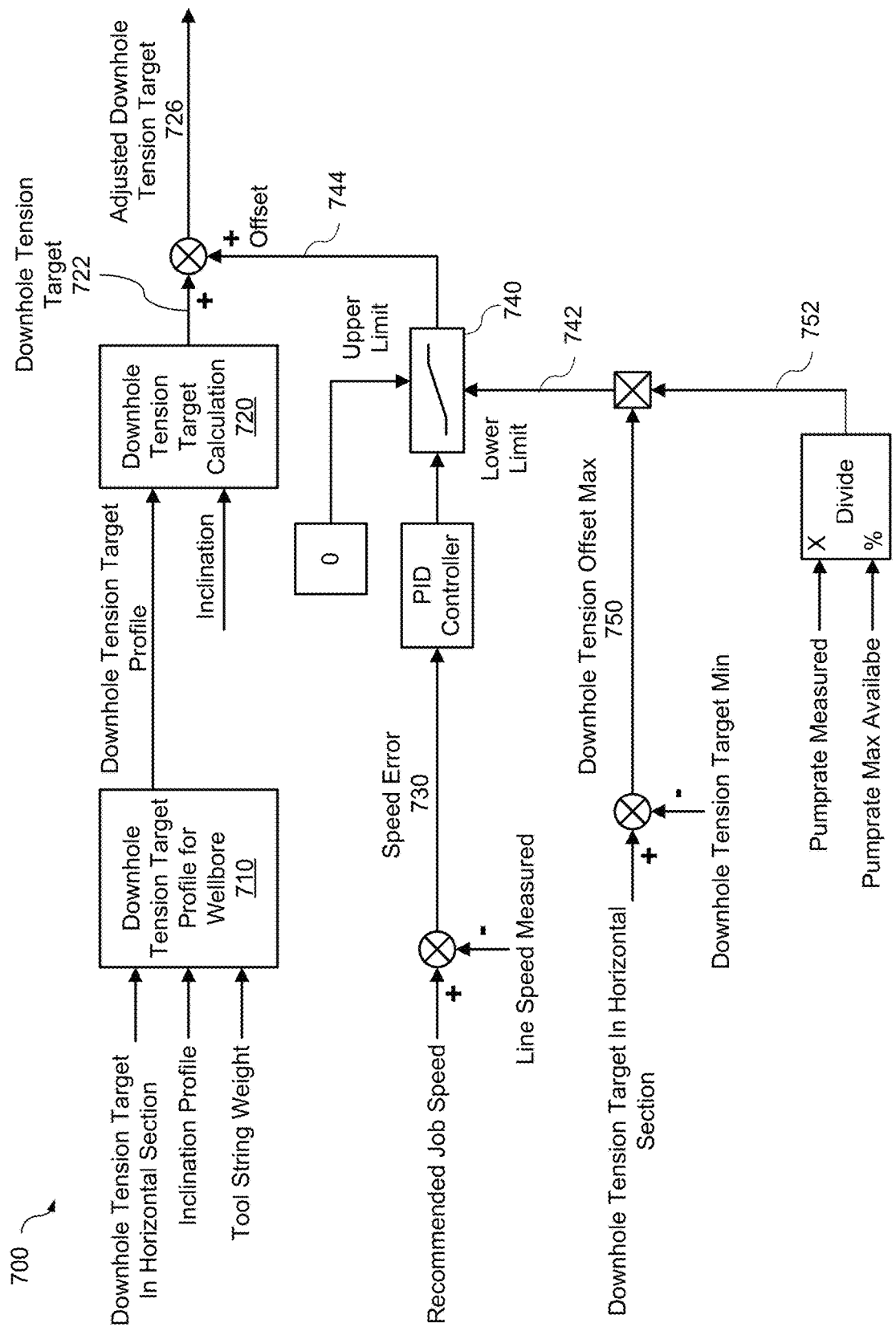
FIG. 7 is a block diagram illustrating an example of a process for adjusting a value of a downhole tension target according to some aspects of the present disclosure.

FIG. 7 is a block diagram illustrating an example of a process 700 for adjusting a value of a downhole tension target according to some aspects of the present disclosure. The process 700 may be performed by the downhole tension target calculation block 660. A downhole tension target profile 710 may be obtained using an inclination profile, tool weight, and downhole tension target in a horizontal section for the particular wellbore. The downhole tension target profile 710 may be a look-up table of wellbore inclination and downhole tension target in a horizontal section. The downhole tension target computation block 720 may compute the value of the downhole tension target 722 using the downhole tension target profile 710 and the inclination of the wellbore. The value of the downhole tension target 722 may be computed in real-time. For example, the value of the downhole tension target 722 may be computed as shown in Equation 1:

$$\text{DHTEN\_target} = W * \cos(\alpha) + \text{DHTEN\_horizontal} \quad (1)$$

where DHTEN_target is the downhole tension target, W is the tool weight, α is the inclination of the wellbore, and DHTEN_horizontal is the downhole tension target in horizontal section. Inclination of the wellbore may be measured, or may be computed from measured depth and an existing inclination versus depth profile. Determination of the downhole tension target is described more fully above with respect to FIG. 6.

The target value of downhole tension may be adjusted to produce an adjusted downhole tension target 726. The adjustments may take into account recommended job speed, measured line speed, minimum downhole tension target, downhole tension target in horizontal section and/or measured pumprate, and/or maximum pumprate available. Recommended job speed may be computed based on geometries of the wireline tool and the wellbore, fluid properties, inclination of the wellbore, or available maximum pumprate, or maximum safe speed of the winch, among other parameters. Recommended job speed may be compared with measured line speed, and the speed error 730 between recommended job speed and measured line speed is input to the PID controller (e.g., the first PID controller 610. The output of PID controller is passed through a saturation block 740.

The saturation block 740 may produce an output that is the value of the input bounded to upper and lower limit saturation values. The upper limit value for the saturation block 740 may be zero. The lower limit value 742 for the saturation block 740 may be calculated as product of downhole tension offset maximum 750 and a ratio 752 of the measured pumprate and available maximum pumprate. The downhole tension target horizontal section may be compared with the downhole tension target minimum to generate the downhole tension offset maximum 750. The downhole tension target value may be adjusted based on the offset 744 to obtain the adjusted downhole tension target 726.

Figure 8:
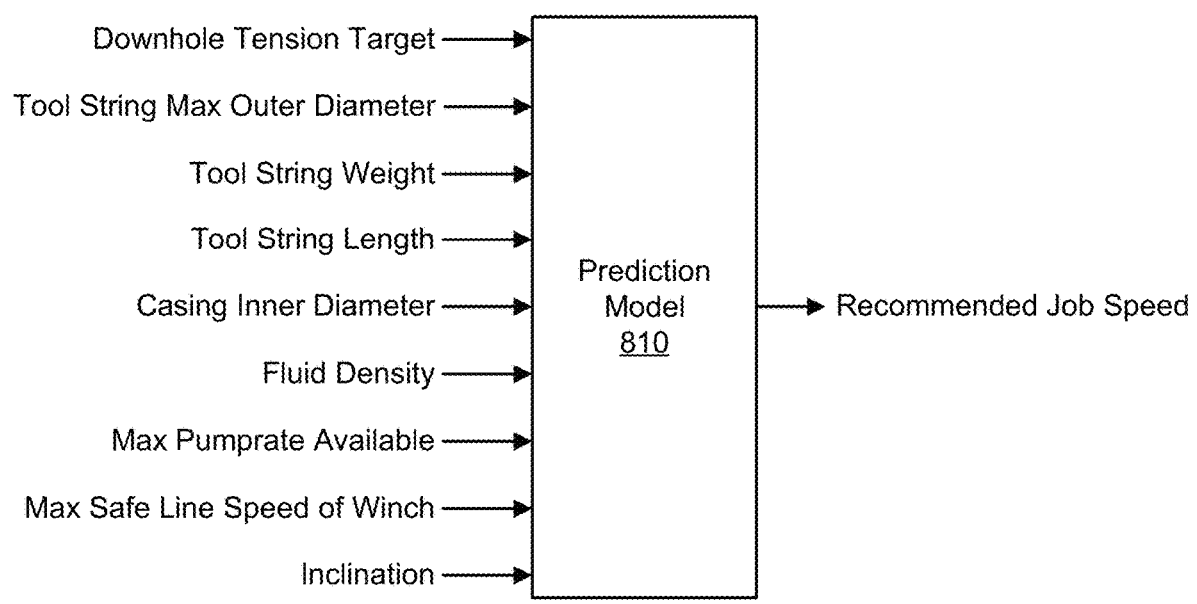
FIG. 8 is a diagram illustrating an example of computing recommended job speed according to some aspects of the present disclosure.

FIG. 8 is a diagram illustrating an example of computing recommended job speed according to some aspects of the present disclosure. Recommended job speed may be determined using a physics-based prediction model 810. Input parameters to the physics-based prediction model 810 may include downhole tension target, maximum pumprate available, tool string maximum outer diameter, tool string weight, tool string length or tool string volume, wellbore casing inner diameter, fluid density, and maximum safe line speed of winch, among other input parameters. The physics-based prediction model 810 may be built by balancing forces on the wireline tool in downhole during pump-down operations. The output of the physics-based prediction model 810 may be the recommended job speed.

Figure 9:
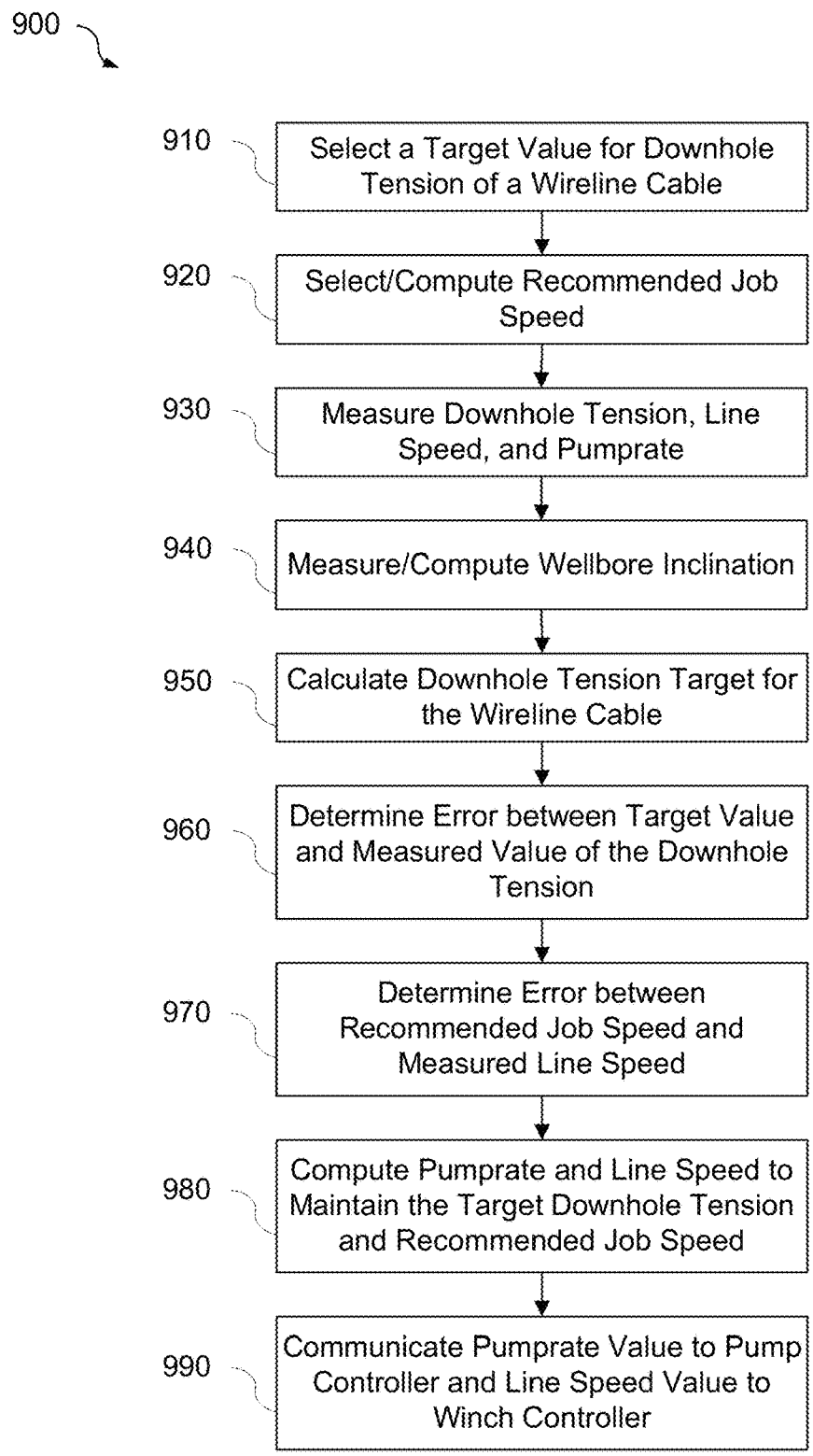
FIG. 9 is a flowchart illustrating an example of a method for controlling an automated pump-down operation in a wellbore according to some aspects of the present disclosure.

FIG. 9 is a flowchart illustrating an example of a method 900 for controlling an automated pump-down operation in a wellbore according to some aspects of the present disclosure. Referring to FIG. 9, at block 910 a target value for minimum downhole tension of a wireline cable to run a wireline tool down an inclined section of a wellbore may be selected.

At block 920, a recommended job speed may be determined. The recommended job speed may be selected or computed based on geometries of the wireline tool and the wellbore, fluid properties, inclination of the wellbore, or available maximum pumprate, or maximum safe speed of the winch, among other parameters. In some implementations, the recommended job speed may be determined using a physics-based prediction model 810. Input parameters to the physics-based prediction model 810 may include downhole tension target, maximum pumprate available, tool string maximum outer diameter, tool string weight, tool string length or tool string volume, wellbore casing inner diameter, fluid density, and maximum safe line speed of winch, among other input parameters.

At block 930, the downhole tension of the wireline cable, line speed, and pumprate may be measured. The wireline speed from the winch, pumprate from a hydraulic pump, and inclination of the wellbore may be measured by various sensors and gauges on a wireline tool, the winch, and the hydraulic pump, or by other methods. The measured parameters may be communicated to the control module (e.g., the control module 500).

At block 940, the inclination of the wellbore may be determined. The inclination of the wellbore may be measured or computed. For example, a wireline tool may be used to measure inclination. In some cases, the inclination may be computed from an inclination profile of the wellbore, for example using a look-up table.

At block 950, a downhole tension target for the wireline cable may be calculated. The target value downhole tension target value may be computed (e.g., by the downhole tension target calculation block 660) using configuration parameters including recommended job speed, downhole tension target in inclined section of the wellbore, downhole tension target minimum, tool string weight, maximum available pumprate, and winch speed safe limit, as well as measurement parameters including downhole tension, line speed, pumprate, and wellbore inclination.

At block 960, an error may be determined between the target value of the downhole tension and the measured value of the downhole tension on the wireline cable. For example, the target value and the measured value may be compared, and a difference between the target value of the downhole tension and the measured value of the downhole tension may be generated as an error value. An error value exceeding a threshold set in a deadband calculation block may be passed to a PID controller.

At block 970, an error may be determined between the recommended job speed and the measured line speed. For example, the recommended job speed value and the a measured line speed value may be compared, and a difference between the recommended job speed and the measured line speed may be generated as an error value and passed to a PID controller.

At block 980, the control module may generate line speed signals and pumprate signals to maintain the target value of the wireline cable tension. For example, PID controllers in the control module may input the error values and generate the line speed signals and pumprate signals for the winch controller and the hydraulic pump controller.

At block 990, the pumprate signal and the line speed signal may be communicated. The control module may communicate the pumprate signal to the hydraulic pump controller and may communicate the line speed signal to the winch controller. The pumprate signal and the line speed signal may the cause the winch controller to balance the line speed with hydraulic pressure (pumprate) provided by the hydraulic pump controller to provide the target downhole tension on the wireline cable.

The specific steps illustrated in FIG. 9 can provide a particular method for controlling an automated pump-down operation in a wellbore according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 9 may include multiple sub-operations that may be performed in various sequences as appropriate to the individual operation. Furthermore, additional operations may be added or removed depending on the particular applications.

The method 900 may be embodied on a non-transitory computer readable medium, for example, but not limited to, the memory 208 or other non-transitory computer readable medium known to those of skill in the art, having stored therein a program including computer executable instructions for making a processor, computer, or other programmable device execute the operations of the methods.

Figure 10:
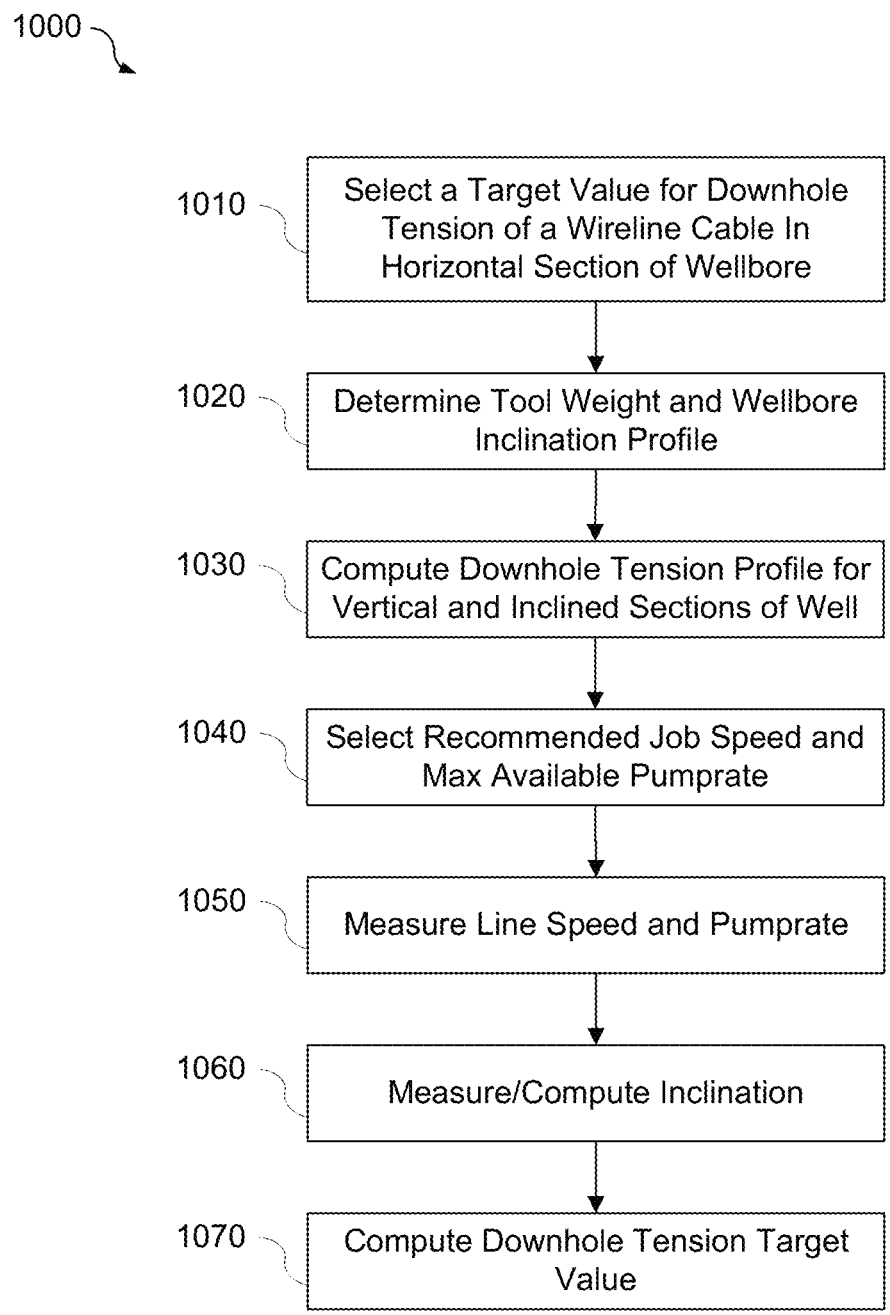
FIG. 10 is a flowchart illustrating an example of a method for calculating the downhole tension target value according to some aspects of the present disclosure.

FIG. 10 is a flowchart illustrating an example of a method 1000 for calculating the downhole tension target value according to some aspects of the present disclosure. Referring to FIG. 10, at block 1010, a target value for tension of the wireline cable in a horizontal section of the wellbore may be selected. The target value for tension may be input to the control module. For example, the target value for tension may be input to the downhole tension target calculation block of the control module.

At block 1020, the tool weight and wellbore inclination profile may be determined. The value for the tool weight and wellbore inclination profile may be input to the control module. For example, the tool weight and wellbore inclination profile may be input to the downhole tension target calculation block of the control module.

At block 1030, a downhole tension target profile for wellbore may be computed. The value for the tool weight and wellbore inclination profile may be may be used together with the a target value for tension in a horizontal section of the wellbore to generate a downhole tension target profile for wellbore for vertical and inclined sections of the wellbore.

At block 1040, a recommended job speed and a maximum available pumprate may be selected. The recommended job speed may be computed based on parameters including geometries of the wireline tool and the wellbore, fluid properties, inclination of the wellbore, or available maximum pumprate, or maximum safe speed of the winch, etc. The maximum available pumprate may depend on the availability of hydraulic pumping equipment at a particular site.

At block 1050, the line speed and pumprate may be measured. The wireline speed from the winch may be measured by various sensors and gauges on a wireline tool or the winch. The pumprate may be measured by various sensors and gauges on the hydraulic pumps. The measured parameters may be communicated to the control module.

At block 1060, the inclination of the wellbore may be determined. The inclination may be measured or computed. The inclination of the wellbore may be measured or computed. For example, a wireline tool may be used to measure inclination. In some cases, the inclination may be computed from an inclination profile of the wellbore, for example using a look-up table.

At block 1070, the downhole tension target value may be computed. The target value downhole tension target value may be computed by the control module using configuration parameters including recommended job speed, downhole tension target in inclined section of the wellbore, downhole tension target minimum, tool string weight, maximum available pumprate, and winch speed safe limit, as well as measurement parameters including downhole tension, line speed, pumprate, and wellbore inclination.

The specific steps illustrated in FIG. 10 can provide a particular method for calculating the downhole tension target value according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 10 may include multiple sub-operations that may be performed in various sequences as appropriate to the individual operation. Furthermore, additional operations may be added or removed depending on the particular applications.

The method 1000 may be embodied on a non-transitory computer readable medium, for example, but not limited to, the memory 208 or other non-transitory computer readable medium known to those of skill in the art, having stored therein a program including computer executable instructions for making a processor, computer, or other programmable device execute the operations of the methods.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
  a winch controller configured to control a line speed of a support cable for conveying a wireline tool string down a section of a wellbore;
  a pump controller configured to control a pumprate of a hydraulic pump; and
  a control module configured to communicate with the winch controller and the hydraulic pump, the control module further configured to:
    generate a line speed signal for controlling a line speed of the support cable and a pumprate signal to control a pumprate of a hydraulic fluid in the wellbore;
    determine a first error between a target value for downhole tension of the support cable and a measured value of the downhole tension;
    determine a second error between a recommended job speed and an actual line speed; and
    maintain the target value for the downhole tension by simultaneously controlling the line speed of the support cable and the pumprate of the hydraulic fluid using a value for the line speed signal and a value for the pumprate signal generated based on the first and second errors.

2. The system of claim 1, wherein the control module is further configured to:
  maintain the recommended job speed when measured downhole tension is within a range of a minimum downhole tension target and a maximum downhole tension target.

3. The system of claim 1, wherein the control module is further configured to:
  simultaneously control the line speed of the support cable and the pumprate of the hydraulic fluid automatically with a control algorithm using the generated value for the line speed signal and the generated value for the pumprate signal.

4. The system of claim 1, wherein the section of the wellbore is a vertical section, an inclined section, or a horizontal section.

5. The system of claim 1, wherein the control module is further configured to:
  determine the target value for downhole tension based on at least one of weight of the wireline tool string, inclination of the wellbore or a target value of downhole tension in a horizontal section.

6. The system of claim 1, wherein the control module is further configured to:
  determine the target value for downhole tension from a look-up table correlating the target value for downhole tension with an inclination of the wellbore.

7. The system of claim 1, wherein the control module is further configured to:
  adjust the target value for downhole tension based on at least one of the recommended job speed, measured line speed, minimum downhole tension target, or measured pump rate, or maximum available pumprate.

8. A method for controlling a pump-down operation in a wellbore, the method comprising:
  selecting a target value for downhole tension of a support cable and a recommended job speed to convey a wireline tool string down a section of the wellbore;
  generating a line speed signal for controlling a line speed of the support cable and a pumprate signal to control a pumprate of a hydraulic fluid in the wellbore;
  determining a first error between the target value for downhole tension and a measured value of the downhole tension;
  determining a second error between the recommended job speed and an actual line speed; and
  maintaining the target value for the downhole tension by simultaneously controlling the line speed of the support cable and the pumprate of the hydraulic fluid using a value for the line speed signal and a value for the pumprate signal generated based on the first and second errors.

9. The method of claim 8, further comprising:
maintaining the recommended job speed when measured downhole tension is within a range of a minimum downhole tension target and a maximum downhole tension target.

10. The method of claim 8, further comprising:
simultaneously controlling the line speed of the support cable and the pumprate of the hydraulic fluid automatically with a control algorithm using the generated value for the line speed signal and the generated value for the pumprate signal.

11. The method of claim 8, further comprising:
displaying the generated value for the line speed signal and the generated value for the pumprate signal on a user interface; and
manually controlling the line speed and the pumprate based on the generated value for the pumprate signal.

12. The method of claim 8, wherein the recommended job speed is selected by an operator.

13. The method of claim 8, wherein the recommended job speed is determined based on geometries of the wireline tool string and the wellbore, fluid properties, inclination of the wellbore, or a maximum pumprate available.

14. The method of claim 8, wherein the recommended job speed is determined using a prediction model based on one or more of the target value for downhole tension, maximum available pumprate, maximum outer diameter of the wireline tool string, weight of the wireline tool string, length of the wireline tool string, casing inner diameter, density of hydraulic fluid used, or maximum safe line speed of a winch.

15. The method of claim 8, wherein the target value for downhole tension is determined based on at least one of weight of the wireline tool string, inclination of the wellbore or a target value of downhole tension in a horizontal section.

16. The method of claim 8, wherein the target value for downhole tension is determined from a look-up table correlating the target value for downhole tension with an inclination of the wellbore.

17. The method of claim 8, wherein the target value for downhole tension is adjusted based on at least one of the recommended job speed, measured line speed, minimum downhole tension target, or measured pump rate, or maximum available pumprate.

18. A non-transitory computer-readable medium having stored therein instructions for making a processor execute a method for controlling a pump-down operation in a wellbore, the processor-executable instructions comprising instructions for performing operations including:
selecting a target value for downhole tension of a support cable and a recommended job speed to convey a wireline tool string down a section of the wellbore;
generating a line speed signal for controlling a line speed of the support cable and a pumprate signal to control a pumprate of a hydraulic fluid in the wellbore;
determining a first error between the target value for downhole tension and a measured value of the downhole tension;
determining a second error between the recommended job speed and an actual line speed; and
maintaining the target value for the downhole tension and the recommended job speed by simultaneously controlling the line speed of the support cable and the pumprate of the hydraulic fluid using a value for the line speed signal and a value for the pumprate signal generated based on the first and second errors,
wherein the recommended job speed is maintained when measured downhole tension is within a range of a minimum downhole tension target and a maximum downhole tension target.

19. The non-transitory computer-readable medium of claim 18, wherein the instructions for selecting the recommended job speed include instructions for:
determining the recommended job speed using a prediction model based on one or more of the target value for downhole tension, maximum available pumprate, maximum outer diameter of the wireline tool string, weight of the wireline tool string, length of the wireline tool string, casing inner diameter, density of hydraulic fluid used, or maximum safe line speed of a winch.

20. The non-transitory computer-readable medium of claim 18, wherein the instructions for controlling a pump-down operation include:
adjusting the target value for downhole tension based on at least one of the recommended job speed, measured line speed, minimum downhole tension target, or measured pump rate, or maximum available pumprate.

* * * * *